(12) United States Patent
Vorwerk et al.

(10) Patent No.: US 9,783,707 B2
(45) Date of Patent: Oct. 10, 2017

(54) ADHESIVE TAPE WITH A LONG-FIBER STITCH-BONDED FLEECE

(71) Applicant: Coroplast Fritz Müller GmbH & Co. KG, Wuppertal (DE)

(72) Inventors: Guido Vorwerk, Warrendorf (DE); Gülay Wittig, Bochum (DE); Christoph Lodde, Holzwickede (DE)

(73) Assignee: COROPLAST FRITZ MULLER GMBH & CO. KG, Wuppertal (DE)

( * ) Notice: Subject to any disclaimer, the term of this patent is extended or adjusted under 35 U.S.C. 154(b) by 47 days.

(21) Appl. No.: 14/757,693

(22) Filed: Dec. 23, 2015

(65) Prior Publication Data

US 2016/0177139 A1    Jun. 23, 2016

(30) Foreign Application Priority Data

Dec. 23, 2014   (DE) .......................... 10 2014 119 519

(51) Int. Cl.
  *B32B 5/02*     (2006.01)
  *C09J 7/04*     (2006.01)
  *C09J 133/00*   (2006.01)

(52) U.S. Cl.
  CPC ............... *C09J 7/04* (2013.01); *C09J 133/00* (2013.01); *C09J 2201/122* (2013.01); *C09J 2201/606* (2013.01); *C09J 2201/622* (2013.01); *C09J 2203/302* (2013.01); *C09J 2421/00* (2013.01); *C09J 2433/00* (2013.01)

(58) Field of Classification Search
  CPC ..... Y10T 428/24033; B32B 5/02; B32B 5/10; C09J 7/04; C09J 2203/302
  USPC ........................................................ 428/102
  See application file for complete search history.

(56) References Cited

U.S. PATENT DOCUMENTS 9,090,801 B2 * 7/2015 Siebert ........................ C09J 7/04

FOREIGN PATENT DOCUMENTS

EP         0 668 336 A1   1/1994

* cited by examiner

*Primary Examiner* — Alexander Thomas
(74) *Attorney, Agent, or Firm* — Brinks Gilson & Lione

(57) ABSTRACT

An adhesive tape (1), including a substrate (6) including a stitched fleece (2) and an adhesive layer (7) applied on one side to the substrate (6), wherein the stitched fleece (2) is formed at least 80% of long fibers (3) that have a fiber length ($L_1$) of 80 mm to 120 mm. The adhesive tape having improved abrasion properties while maintaining a high noise damping.

26 Claims, 3 Drawing Sheets

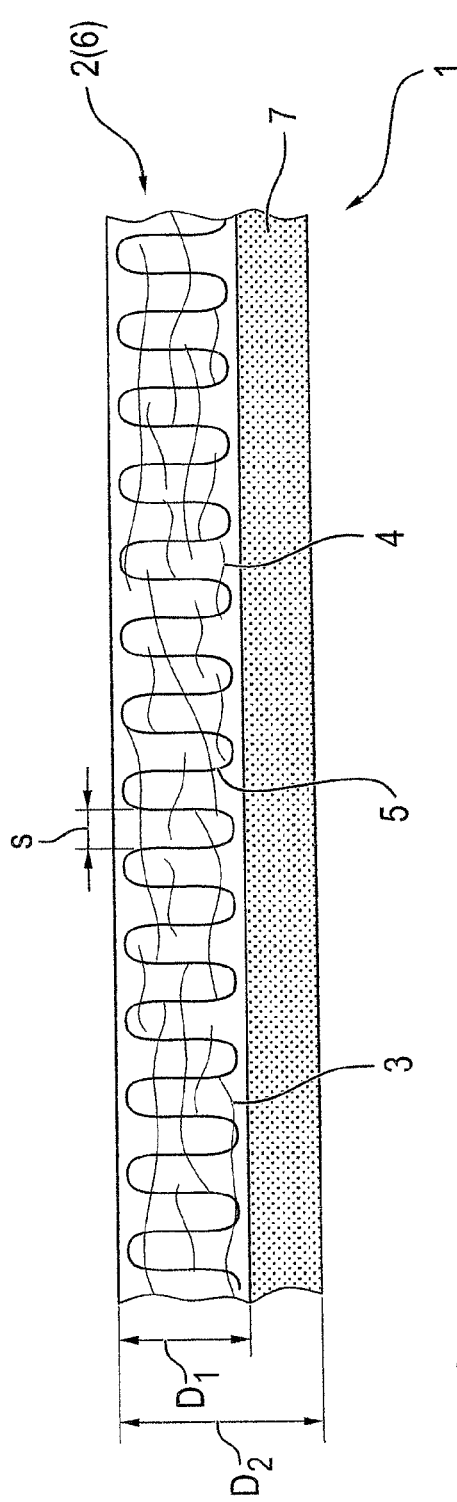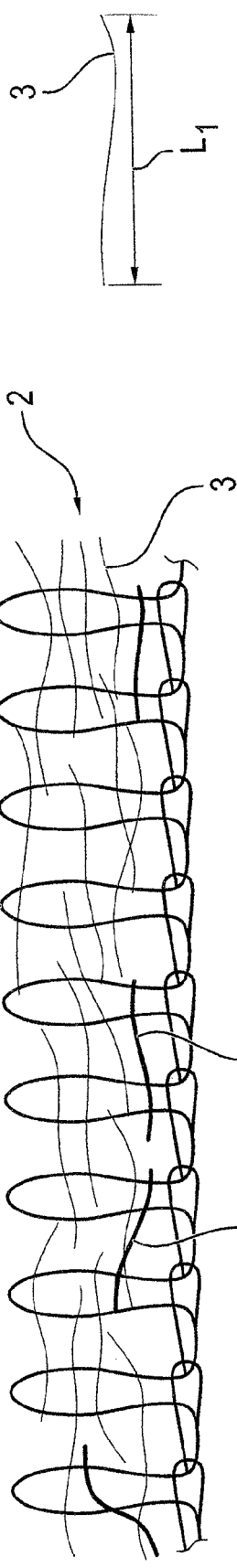

ADHESIVE TAPE WITH A LONG-FIBER STITCH-BONDED FLEECE

CROSS REFERENCE TO RELATED APPLICATIONS

This application claims priority to German Patent Application No. 10 2014 119 519.1, filed Dec. 23, 2014.

FIELD OF THE INVENTION

The invention relates to an adhesive tape including a substrate having a stitched fleece, and at least one adhesive layer applied one-side on the substrate, wherein the stitched fleece is formed at least 80% from long fibers, which have a fiber length of at least 80 mm.

A "stitched fleece" here is understood to mean a textile fiber structure that is composed of a plurality of layers stitched to one another using at least one stitching yarn.

BACKGROUND

An adhesive tape including a substrate formed from a stitched fleece is known, for example, from EP 0 668 336 B2. Furthermore, an adhesive tape of the above-described type is known, which is sold under the product name Coroplast 8510 X. The known adhesive tape types are suitable for wrapping cable sets in vehicles, in order to, for example, prevent rattling noises. Rattling noises are caused, for example, by a contacting of the cable with the vehicle body or other parts. The adhesive tapes of the type mentioned must meet uniform standards, in particular standard LV 312 (October 2009), with respect to their usage properties. This standard classifies adhesive tapes with respect to their properties for use in the automobile industry, preferably for bundling and winding of cables and cable sets. The above-mentioned standard was developed by representatives of the automobile manufacturers Audi AG, BMW AG, Daimler AG, Porsche AG, and Volkswagen AG. When the standard LV 312 is mentioned below, the corresponding edition of October 2009 is always meant.

The usage properties of adhesive tapes include, for example, the adhesive force on the tape back and the unrolling force as well as the manual tearability. Further usage properties are the adhesive force on certain materials, the thickness, the elongation at break, the breaking force, the tear resistance, and the abrasion resistance.

To avoid rattling noises it is advisable that the adhesive tapes have noise damping properties. Depending on the field of use there are adhesive tapes having different noise-damping classes.

The abrasion resistance is important for the robustness of the adhesive tape with respect to mechanical stress. An improvement of this parameter is achieved in a known way by increasing the grammage of the fleece or the adhesive application weight of the adhesive tape. With both methods a concomitant worse noise damping of the adhesive tape is taken into account.

The object of the invention is to improve the usage properties of adhesive tapes known to date of the above-described type. In particular, an adhesive tape is to be provided having improved abrasion properties while maintaining a high noise damping.

SUMMARY AND INTRODUCTORY DESCRIPTION OF THE INVENTION

This object is inventively achieved in part by the long fibers having a fiber length in the range from 80 mm to 120 mm.

With the inventive solution it surprisingly emerges that adhesive tapes including fleeces including fleece fibers longer than used to date have improved abrasion resistance with noise-damping properties remaining the same. Thus the inventive fleece as substrate material can be embodied thinner than fleece for adhesive tapes of the above-mentioned type. Using modern crimping methods or combing methods, a homogeneous fiber distribution and thus also a consistently high product quality is achievable here.

In addition to the long fibers the stitched fleece can preferably also contain short fibers, which have a length in the range from 40 mm to 60 mm, preferably a length in the range from 45 mm to 55 mm. the manual tearability of the adhesive tape is adjustable via the length of the short fibers. The long fibers of such a fleece should preferably have a length of exactly 80 mm. The definition of long fibers and short fibers according to the application thus deviates from the usual definition for natural fibers, according to which short fibers have a length in the range from 40 mm to 100 mm, and long fibers have a length greater than 100 mm.

With the use of fleeces including the short fibers and long fibers described according to this application for manufacturing adhesive tapes, it has surprisingly been shown that using a proportion of short fibers falling in the specified range the adhesive force on the tape back and the unrolling force can be improved compared to known adhesive tapes of the above-described type. The breaking force and the adhesive force of the adhesive tape can also be optimized by a proportion of short fibers in the stitched fleece.

The stitched fleece advantageously exclusively includes long fibers. In this way the elongation at break of the stitched fleece as well as of the adhesive tape can be improved.

In particular the substrate is formed exclusively of the stitched fleece. The omission of further substrate materials, such as, e.g., foils or fabric layers, has the advantage that the usage properties of the adhesive tape are adjustable by fewer parameters: for this purpose only the properties of the fleece and of the adhesive are to be changed.

The stitched fleece advantageously includes fibers that have a fiber strength in the range from 2 dtex to 3 dtex. Fine fibers of this type can have a lower inherent stability than thicker fibers of an identical material. They can thereby be better connected to other fibers. This is because their effective contact surface, which is determined by the ratio between the fiber surface and the fiber volume, is greater than in thicker fibers. A high strength of the fleece is thereby achieved.

In particular the stitched fleece contains stitching yarns for stitching the fiber layers, which stitching yarns have a fiber strength in the range of 40 dtex to 60 dtex, preferably a yarn strength of 50 dtex. The ratio between the fiber fineness and the yarn fineness consequently preferably falls in a range of 2:50 to 3:50. The tear properties of the fleece or of the adhesive tape are influenced by this ratio.

In a preferred embodiment the long fibers have a proportion in the range from 85% to 95%, and the short fibers correspondingly have a proportion in the range from 15% to 5%. The thickness of the fleece is thereby adjustable: the more long fibers are contained proportionally in the fleece, the lesser the fleece thickness for the same grammage. Furthermore, the elongation at break and the breaking force are better the more long fibers are contained in the stitched fleece.

The stitched fleece can preferably have an elongation at break in the range from 25% to 58% according to the standard LV 312 (October 2009). Furthermore, the stitched fleece can advantageously have a breaking strength in the range from 35 N/cm to 65 N/cm according to the standard LV 312 (October 2009). In this way a high loadability of the adhesive tape can be achieved, since both its elongation at break and its breaking strength are influenced by the elongation at break and the breaking strength of the fleece.

Preferably a part of the fibers or all of the fibers can be formed partially or completely of polyester (PES). Polyester fibers are advantageous since they have, for example, a low thickness, a high tenacity and elongation at break, a very good dielectric behavior, a low water absorption, and a low wear. In particular, it is possible that a part of the fibers or all fibers are formed partially or completely of polyethylene terephthalate (PET).

In particular the adhesive tape can have an abrasion resistance in a range from 350 strokes to 800 strokes, preferably in a range from 450 strokes to 750 strokes, according to the standard LV 312 (October 2009). The good abrasion resistance of an adhesive tape is advantageous for fields of use wherein the adhesive tape is exposed to high mechanical stress.

BRIEF DESCRIPTION OF THE DRAWINGS

The invention shall be explained in greater detail based on the exemplary embodiments depicted in the drawings:

FIG. 1 shows a schematic cross-section of an inventive adhesive tape including an inventive stitched fleece, FIG. 2a shows a schematically depicted cross-section of a first embodiment of an inventive stitched fleece including long fibers, FIG. 2b shows a view of a long fiber of the stitched fleece according to the first embodiment.

FURTHER DESCRIPTION OF THE INVENTION

Figure 3A:
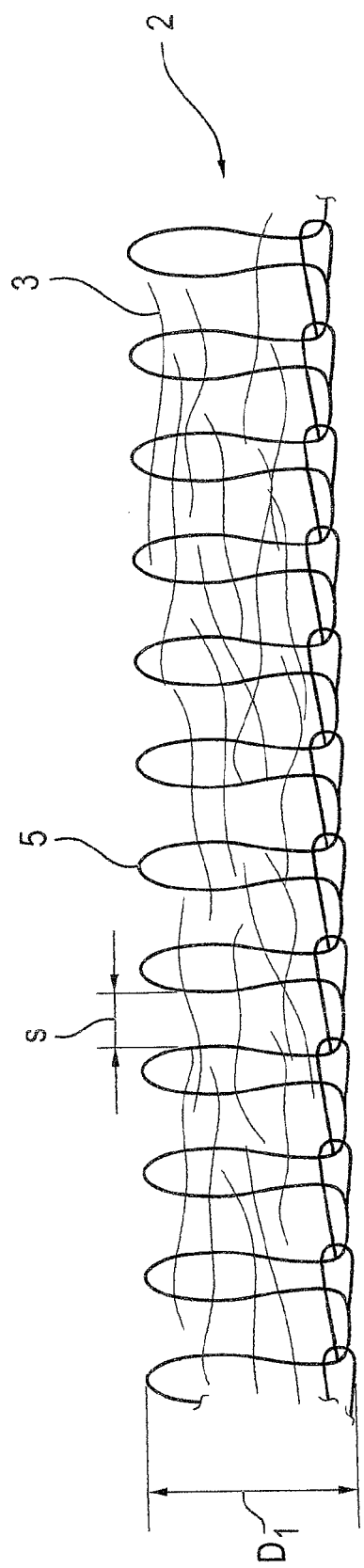
FIG. 3a shows a schematically depicted cross-section of a second embodiment of an inventive stitched fleece including long fibers and short fibers.

In the different figures of the drawings identical parts are always provided with the same reference numbers so that as a rule they are only described once.

For the subsequent description it is emphasized that the invention is not limited to the exemplary embodiments and here not limited to all or a plurality of features of described feature combinations, but rather each individual partial feature of the exemplary embodiment or of each exemplary embodiment is also of significance for the subject matter of the invention in itself and also in combination with any features of another exemplary embodiment, even separate from all other partial features described in connection therewith.

The property parameters of the stitched fleece 2 and of the adhesive tape 1, which property parameters are embodied in the description, are determined according to the standard LV 312 (October 2009). For the stitched fleece 2 these parameters include the thickness $D_1$, the elongation at break, the breaking force, the tear resistance, and the manual tearability. For the adhesive tape 1 these parameters include the thickness $D_2$, the elongation at break, the breaking force, the adhesive force on steel, the adhesive force on the tape back, the unrolling force, the manual tearability, the noise damping, and the abrasion resistance. For the last two parameters a classification occurs hereinafter.

FIG. 1 shows an inventive adhesive tape 1, including a substrate 6 formed from a stitched fleece 2, and an adhesive layer 7 applied one-side on the substrate 6. The stitched fleece 2 preferably formed of a textile fleece material, which is a textile sheet mane from a sequential connection and/or sequential layering of ordered and unordered fibers. The fleece material can be formed of long fibers extending along the tape extension direction and transverse fibers extending transverse to the longitudinal fibers, or a completely disordered placement of fibers.

According to the invention, the stitched fleece 2 includes long fibers 3. The stitched fleece 2 advantageously includes two fiber types, i.e., long fibers 3 and short fibers 4. The fiber strength of the fibers 3, 4 of both types falls in particular in the range from 2 dtex to 3 dtex. To form the stitched fleece 2 to the long fibers 3 and/or short fibers 4 for are advantageously stitched with stitching yarns 5, which have a fiber strength of preferably 50 dtex. In particular, the stitched fleece 2 has a grammar in the range from 120 g/m$^2$ to 140 g/m$^2$. Furthermore, the stitched fleece 2 preferably has a thickness $D_1$ in the range from 0.40 mm to 0.55 mm, in particular in the range from 0.45 mm to 0.50 mm. This thickness is measured according to the standard DIN EN 1942. Preferably a proportion of the fibers 3, 4 or all fibers 3, 4 are formed partially or completely of plastic, preferably polyethylene terephthalate (PET).

Figure 4:
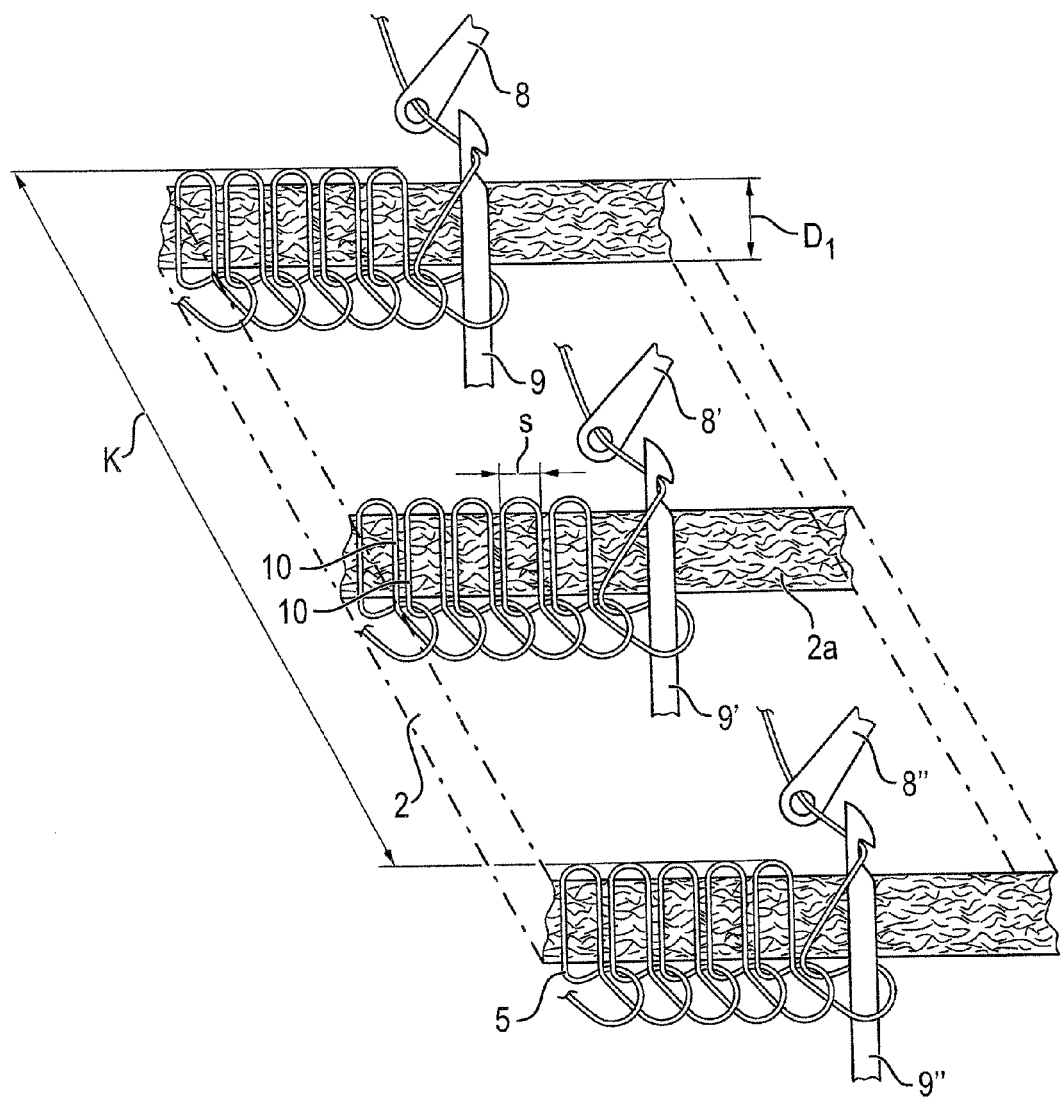
FIG. 4 shows a view of a stitched fleece during manufacturing.

The manufacturing of a stitched fleece 2 occurs, for example, as schematically depicted in FIG. 4. Here FIG. 4 schematically shows a stitched fleece 2, wherein stitching yarns 5 are stitched with a fineness F. Here the fineness F is a measure for the stitch density. It is based on the "English fineness," which specifies in a numbering system used in knitters and knitting machines the number n of stitching needles 9, 9', 9" allocated to an English inch (25.4 mm) over the distance K, and thus the stitch density.

In the stitched fleece schematically depicted in FIG. 4, for example, at least n=3 needles 9, 9', 9" disposed over a distance K have been used for manufacturing the stitched fleece 2. The English fineness F is defined in DIN ISO 8188:2009-02 "Textilmaschinen and Zubehör—Teilung von maschenbildenden Maschinen". According to the invention here finenesses in the range F 14 to F 24, in particular F 22, are preferred.

For example, for manufacturing a stitched fleece 2, two sewing-yarn systems (i.e., two bars) are used to form stitches through a raw fleece 2a. However, one-bar or three-bar systems are also possible. With the two-bar system a stitching yarn 5 is guided by a first set of movable stitching-yarn guides 8, 8', 8", which are supported by a first guide bar (not shown), for an interacting, complete yarn engagement with the needles 9, 9', 9", etc. over the width of the raw fleece 2a.

To produce the stitches in the stitched fleece 2, in operation the stitching yarns 5 are moved in engagement with the needles 9, 9', 9", which in turn guide the sewing yarns 5 in a back-and-forth manner through the raw fleece 2a. An arrangement of interacting stitching-yarn stitches 10 is thereby formed, which extend in rows, spaced with respect to one another, along the raw fleece 2a.

In a solely exemplary and non-limiting manner the interacting stitching-yarn stitches 10 can be held in a complete chain-stitch configuration, although other known stitch arrangements, e.g., tricot stitches and the like, can also be used.

In particular, the stitched fleece 2 can be produced using the stitch-bonding technology "Maliwatt." According to the Maliwatt method, a raw fleece 2a is strengthened by it being configured as an introduced crosswise plaited fibrous web or a tangled fleece stitched by one or two yarn systems. For this purpose a compound-needle/closingwire system pierces the fibrous web, and during the backward movement pulls one or two of the placed stitching yarns 5 through the to-be-strengthened raw fleece 2a. The reducing of the previous stitches and the withdrawal of the product downward follow.

Preferably the stitching yarns 5 are stitched into the stitched fleece 2 with a stitch length s of 1.0 mm. The "stitch length s" here is understood to mean the distance between the entry point of the stitching yarn 5 in the fiber structure and its exit point.

The adhesive tape 1 manufactured using the stitched fleece 2 preferably has an unrolling force in the range from 5.6 N/cm to 5.8 N/cm. The unrolling force here is the force required for unrolling an adhesive-tape roll. It affects the winding tension during the taping of cable sets, which, for example, affects the winding hardness of a cable harness. Too-high unrolling forces can result in a twisting, and thus in a shortening, in particular of thin cable strands. Too-low unrolling forces can result in handling problems and, in addition, soft cable strands with unclean, limp windings.

TABLE 1

Classification of noise-damping properties according to LV 312 (10/2009)

| Noise damping class | Requirement |
| --- | --- |
| A - no noise damping | 0 to ≤2 dB(A) |
| B - slight noise damping | >2 to ≤5 dB(A) |
| C - moderate noise damping | >5 to ≤10 dB(A) |
| D - high noise damping | >10 to ≤15 dB(A) |
| E - very high noise damping | >15 dB(A) |

The adhesive tape preferably has a noise damping of class C. This level corresponds to a noise damping greater than 5 dB(A) up to and including 10 dB(A). An overview of the noise damping classes according to the standard LV 312 (October 2009) is shown in Table 1.

Furthermore, the abrasion properties of the adhesive tape 1 advantageously correspond to the conditions of class C established by the standard. Underlying this is that the adhesive tape 1 advantageously withstands 700 to 800 strokes before it is worn through. In contrast thereto, adhesive tapes known to date of the type mentioned can only withstand 450 strokes. A corresponding overview of the abrasion classes according to the standard LV 312 (October 2009) is shown in Table 2 below.

TABLE 2

Classification of abrasion properties according to LV 312 (10/2009)

| Abrasion class | Requirement |
| --- | --- |
| A - no abrasion protection | <100 strokes |
| B - slight abrasion protection | 100-499 strokes |
| C - moderate abrasion protection | 500-999 strokes |
| D - high abrasion protection | 1000-4999 strokes |
| E - very high abrasion protection | 5000-14999 strokes |
| F - extremely high abrasion protection | 15000-29999 strokes |
| G - abrasion protection for special applications | ≥30000 strokes |

The adhesive layer 7 of the adhesive tape 1 preferably is formed of pressure-sensitive adhesives, in particular based on polyacrylate, which can be used due to their good aging resistance. These acrylate adhesive materials can as a rule be applied either as dispersion or crosslinked hot-melt adhesives via UV radiation. In principle it is also possible to use solvent acrylates or even acrylate-monomer mixtures or acrylate prepolymers. After coating these are optionally polymerized and crosslinked either thermally or using UV radiation. In addition, the use of other adhesive classes, such as, e.g., adhesives based on synthetic rubber, such as SIS (styrene-isoprene-styrene copolymers) or SBS (styrene-butadiene-styrene block copolymers) or adhesives based on silicon or polyurethane is possible.

FIG. 2a shows a first embodiment of an inventive stitched fleece 2 used as substrate 6. This embodiment is referred to below as "long-fiber fleece 100%", since it is formed 100% of long fibers 3. The properties of this stitched fleece 2 can be inferred from Table 3. The features listed in this table can be significant to the invention individually or in any combination. In addition, in Table 3 the properties of the "long-fiber fleece 100%" are contrasted with those of a comparison fleece according to the prior art (middle column of table 3).

The specification "PES virgin" in Table 3 below for the material of the fibers 3, 4 and the stitching yarns 5 means here that the fibers 3, 4 and the stitching yearns 5 are preferably formed partially or completely of a non-recycled polyester. However, stitching yarns 5 made from a recycled polyester also appear to be usable.

Furthermore, the stitching yarns 5 can also be formed—at least partially—of polyethylene (PE), or polypropylene (PP), or polyurethane (PUR), viscose, or polyamide. In particular, such PA P stitching yarns 5 are then partially or completely formed of homopolyamides, e.g., PA 6.6 (PA made from hexamethylendiamine and adipic acid [NH—(CH$_2$)$_6$—NH—CO—(CH$_2$)$_4$—CO]$_n$) or PA6 (PA made from caprolactam [NH—(CH$_2$)$_5$—CO]$_n$). Homopolyamides are derived from an amino acid or a lactam or a diamine and a dicarboxylic acid.

Table 3 below gives an overview of the preferred properties of stitched fleeces 2 usable according to the invention as substrate materials.

In Table 3, the fiber strengths, the filament count, stitch lengths, and the fiber material are listed. These parameters are in particular the same for the "long-fiber fleece 100%" and the comparison fleece. A stitching yarn 5 having a fiber strength of 50 dtex us preferably used for the "long-fiber fleece 100%." The fiber material can be partially or completely formed of textile fibers. For example, yarns can be used wherein yarns made from staple fibers or filaments can be used.

TABLE 3

Properties of the inventive stitched fleece.

|  |  | 130 g/m² | Long-fiber fleece 90% | Long-fiber fleece 100% |
| --- | --- | --- | --- | --- |
| Fineness | n/25 mm | F 22 | F 22 | F 22 |
| Yarn Strength | dtex | 50 | 50 | 50 |
| Filament count | number | 36 | 36 | 36 |
| Stitch length | mm | 1 | 1 | 1 |
| Yarn material | — | PES virgin | PES virgin | PES virgin |
| Fiber material | — | PES virgin | PES virgin | PES virgin |
| Fiber fineness long fiber | dtex | 2.11 | 2.0-3.0 | 2.0-3.0 |
| Fiber fineness short fiber | dtex | 2.43 | 2.0-3.0 | 2.0-3.0 |
| Fiber length long fiber | mm | 76 | 80 | 120 |
| Fiber length short fiber | mm | 51 | 50 | ./. |
| Proportion of | % | 60-80 | 90 | 100 |

TABLE 3-continued

Properties of the inventive stitched fleece.

|  |  | 130 g/m² | Long-fiber fleece 90% | Long-fiber fleece 100% |
|---|---|---|---|---|
| long fibers Proportion of short fibers | % | 40-20 | 10 | 0 |
| Grammage | g/m² | 130 +/- 10 | 130 +/- 10 | 130 +/- 10 |
| Thickness | mm | 0.55 +/- 0.1 | 0.50 +/- 0.1 | 0.45 +/- 0.1 |
| Elongation at break | % | 15-50 | 25-55 | 28-58 |
| Breaking force | N/cm | 30-50 | 35-55 | 42-65 |
| Tear resistance | mN | <13,000 | 15,000 | 18,000 |
| Manual tearability | LV 312 | yes | difficult | difficult |
| Tape back values | N/cm | >4.0 | >4.0 | >4.0 |

A staple-fiber yarn is formed of endlessly-long fibers, which are twisted during spinning. A filament yarn is formed of filaments. A filament is a fiber of unlimited length (according to the standard DIN 60000 (October 1990)) or has at least a length of 1000 mm (according to the standard DIN 60001 (October 1990)). On the other hand, fibers of limited length are referred to as staple fibers. Staple fibers can be divided in turn into actually twistable staple fibers and very short flock fibers, wherein the boundary is 15 mm. Stitching fibers 5 can also be manufactured from staple fibers. Smooth yarns, in particular, so-called pre-oriented yarns (POY—pre oriented yarn) or so-called fully-drawn yarns (FDY—fully drawn yarn) are preferably used for the stitching yarns 5.

The manufacturing of a filament yarn occurs by the swirling of the individual filaments. The number of filaments preferably falls in a range from 34 to 38. In general the stitching yarns 5 can contain from 24 to 144 filaments.

The fiber fineness of the long fiber 3 in the stitched fleece 2 preferably falls in a range from 2 dtex to 3 dtex. The long fiber 3 inventively has a length $L_1$ in the range from 80 mm to 120 mm, preferably its length $L_1$ falls in a range from 110 mm to 130 mm. In a particularly preferred embodiment it is 120 mm. A long fiber 3 for use in a stitched fleece 2, as shown in FIG. 2a, is shown in FIG. 2b. The grammage of this fleece embodiment falls in particular in a range of 60 g/m² to 230 g/m², preferably in a range from 80 g/m² to 160 g/m². For the manufacturing of the stitched fleece 2 the long fiber 3 is advantageously exclusively used. Due to the use of such a long fiber 3, in particular stitched-fleece thicknesses $D_1$ in the range from 0.40 mm to 0.50 mm are achieved, preferably in the range from 0.44 mm to 0.46 mm.

Furthermore, the "long-fiber fleece 100%" advantageously has an elongation at break in the range from 28% to 58% and a breaking force in the range from 42 N/cm to 65 N/cm. Here the breaking force is a measure for the loadability of the adhesive tape 1 during use. The elongation at break is a measure for the elasticity of the adhesive tape 1. The tear resistance is advantageously 18,000 mN. The tear resistance or notch resistance is the property of a material, even with the presence of a notch, of not tearing further. The "long-fiber fleece 100%" is advantageously difficult to tear manually.

The use of a "long-fiber fleece 100%" as substrate 2 advantageously leads to an adhesive tape 1 having the properties shown in Table 4 below, column 5. Here the features listed in Table 4 are of inventive significance individually or in any combination.

TABLE 4

Properties of the inventive adhesive tapes.

|  |  | Standard adhesive tape 8510 X | Adhesive tape of the long-fiber fleece 90% | Adhesive tape of the long-fiber fleece 100% |
|---|---|---|---|---|
| Substrate material | g/m² | 130 | 130 | 130 |
| Adhesive type | — | Acrylate | Acrylate | Acrylate |
| Adhesive application | g/m² | 50-100 | 50-100 | 50-100 |
| Thickness | mm | 0.5 | 0.5 | 0.5 |
| Elongation at break | % | 18 | 20 | 25 |
| Breaking force | N/cm | 35 | 30-36 | 36-50 |
| Adhesive force steel | N/cm | 3.2 | 2.0-4.1 | 3.5-8.0 |
| Adhesive force on tape back | N/cm | 4.2 | 4.5 | 4.3 |
| Unrolling force | N | 5.5 | 5.8 | 5.6 |
| Manual tearability | LV 312 | easy | moderate | difficult |
| Noise-damping class | LV 312 | C | C | C |
| Abrasion-resistance class | LV 312 | B | B-C | C |
| Abrasion resistance | strokes | 200-300 | 450-650 | 700-800 |

In particular, the adhesive tape 1 has an adhesive application on the substrate 2 in a range from 50 g/m² to 100 g/m². Furthermore, the adhesive tape 1 including a "long-fiber fleece 100%" preferably has an elongation at break of 25% and a breaking force in a range from 36 N/cm to 50 N/cm. Moreover, the adhesive force on steel falls in a range from 3.5 N/cm to 8.0 N/cm, the adhesive force on a tape back is 4.3 N/cm, and the unrolling force is 5.6 N. Like the stitched fleece 2 the adhesive tape 1 is also difficult to tear manually. Both the noise damping and the abrasion resistance correspond to class C.

FIG. 3a represents a further embodiment of the inventive stitched fleece 2, which is referred to below as "long-fiber fleece 90%." Two different lengths of fibers 3, 4 are used for manufacturing this stitched fleece 2. Of these the long fibers 3 have a proportion in the range from 85% to 95%, and the short fibers a proportion from 15% to 5%. Especially preferably, the stitched fleece 2 has a long-fiber proportion of 90% and a short-fiber proportion of 10%.

With respect to fineness, yarn strength, filament count, stitch length, and yarn material, the properties of the "long-fiber fleece 90%" preferably correspond to those of the "long-fiber fleece 100%."

Figure 3B:
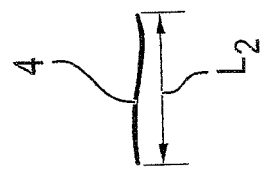
FIG. 3b shows a view of a short fiber of the stitched fleece according to the second embodiment.

The fiber fineness of the long fiber 3 in the stitched fleece 2 falls in particular in a range from 2 dtex to 3 dtex. The short fibers 4 in particular have a fiber fineness in a range from 2 dtex to 3 dtex. The length $L_2$ of the short fibers 4 processed in the "long-fiber fleece 90%" falls in particular in a range from 40 mm to 60 mm, preferably at 50 mm. A view of the fibers 3, 4 processed in the "long-fiber fleece 90%" is shown in FIG. 3b. The long fibers 3 processed in the "long-fiber fleece 90%" advantageously have a length $L_1$ in the range from 70 mm to 90 mm, in particular a length $L_1$ of 80 mm.

The grammage of the "long-fiber fleece 90%" is preferably 130 g/m². The thickness $D_1$ of the stitched fleece 2 falls in particular in a range from 0.45 mm to 0.55 mm, preferably in a range from 0.49 mm to 0.51 mm.

The stitched fleece 2 advantageously has an elongation at break in the range from 25% to 55% and a breaking force of preferably 35 N/cm to 55 N/cm. Furthermore, in particular it has a tear resistance of 15,000 mN and is in particular difficult to tear manually.

The properties of an exemplary embodiment of an adhesive tape 1 including a "long-fiber fleece 90%" are shown in Table 4, column 4. The adhesive tape 1 advantageously has an adhesive application in the range from 50 g/m² to 150 g/m². Such an adhesive tape 1 preferably has an elongation at break of 20% and a breaking force in a range from 30 N/cm to 36 N/cm. Advantageously the adhesive force on steel is in a range from 2.0 N/cm to 4.1 N/cm, the adhesive force on a tape back is 4.5 N/cm, and the unrolling force is 5.8 N. In particular, the manual tearability of an inventive adhesive tape 1 is "moderate" (according to the standard LV 312 (October 2009)), the noise damping preferably corresponds to class C, and the abrasion resistance corresponds to between class B and class C (compare Tables 1 and 2).

The embodiments of the adhesive tape 1 including a "long-fiber fleece 90%" and a "long-fiber fleece 100%" advantageously each have thicknesses $D_2$ in the range from 0.25 to 0.90 mm, preferably in the range from 0.30 to 0.50 mm.

While the above description constitutes the preferred embodiment of the present invention, it will be appreciated that the invention is susceptible to modification, variation and change without departing from the proper scope and fair meaning of the accompanying claims.

The invention claimed is:

1. An adhesive tape comprising a substrate including a stitched fleece and an adhesive layer applied to one side of the substrate, wherein the stitched fleece is formed at least 80% from long fibers, having a fiber length in the range from 80 mm to 120 mm and further comprising in that the stitched fleece contains short fibers which have a length in the range from 40 mm to 60 mm.

2. An adhesive tape according to claim 1, further comprising in that at least one of the long and the short fibers of the stitched fleece are stitched with stitching yarns with a fineness in a range from F 14 to F 24.

3. An adhesive tape according to claim 1, further comprising in that the stitched fleece contains at least one of the long and the short fibers that have a fiber strength in the range from 2 dtex to 3 dtex.

4. An adhesive tape according to claim 1, further comprising in that the long fibers have a proportion in the range from 85% to 95%, and the short fibers correspondingly have a proportion in the range from 15% to 5%.

5. An adhesive tape according to claim 1, further comprising in that the stitched fleece has a grammage in the range from 60 g/m² to 230 g/m².

6. An adhesive tape according to claim 1, further comprising in that the stitched fleece has a thickness in the range from 0.25 mm to 0.90 mm, according to the standard LV 312.

7. An adhesive tape according to claim 1, further comprising in that the stitched fleece has an elongation at break in the range from 25% to 58% according to the standard LV 312.

8. An adhesive tape according to claim 1, further comprising in that the stitched fleece has a breaking force in the range from 35 N/cm to 65 N/cm according to the standard LV 312.

9. An adhesive tape according to claim 1, further comprising in that at least a part of at least one of the long and the short fibers, or at least one of the long or the short fibers, are completely or partially composed of polyester.

10. An adhesive tape according to claim 1, further comprising in that stitching yarns are stitched in the stitched fleece, wherein at least a part of the stitching yarns or all of the stitching yarns are partially or completely composed of polyester.

11. An adhesive tape according to claim 10, further comprising in that the stitched fleece has a tear resistance in the range from 15,000 mN to 18,000 mN according to the standard LV 312.

12. An adhesive tape according to claim 1, further comprising in that the adhesive layer has an application weight in the range from 30 g/m² to 120 g/m².

13. An adhesive tape according to claim 1, further comprising in that the adhesive tape has a thickness in the range from 0.25 mm to 0.90 mm, according to the standard LV 312.

14. An adhesive tape according to claim 1, further comprising in that the adhesive tape has an elongation at break in the range from 20% to 25% according to the standard LV 312.

15. An adhesive tape according to claim 1, further comprising in that the adhesive tape has a breaking force in the range from 30 N/cm to 50 N/cm according to the standard LV 312.

16. An adhesive tape according to claim 1, further comprising in that the adhesive tape has a manual tearability in the range from moderate to difficult according to the standard LV 312.

17. An adhesive tape according to claim 1, further comprising in that the adhesive tape has at least a noise damping of class C according to the standard LV 312.

18. An adhesive tape according to claim 1, further comprising in that the adhesive tape has an abrasion resistance according to the standard LV 312 in a range from 350 strokes to 800 strokes.

19. An adhesive tape according to claim 1, further comprising in that the adhesive layer is a pressure-sensitive synthetic-rubber adhesive or a pressure-sensitive UV-curable polyacrylate.

20. An adhesive tape according to claim 1, further comprising in that the short fibers have a length in the range from 45 mm to 55 mm.

21. An adhesive tape according to claim 1, further comprising in that at least one of the long or the short fibers of the stitched fleece are stitched with stitching yarns with a fineness of F 22.

22. An adhesive tape according to claim 1, further comprising in that the stitched fleece has a grammage in the range from 80 g/m² to 160 g/m².

23. An adhesive tape according to claim 1, further comprising in that the stitched fleece has a thickness in the range from 0.30 mm to 0.60 mm, according to the standard LV 312.

24. An adhesive tape according to claim 1, further comprising in that the adhesive tape has a thickness in the range from 0.30 mm to 0.60 mm according to the standard LV 312.

25. An adhesive tape according to claim 1, further comprising in that the adhesive tape has an abrasion resistance according to the standard LV 312 in a range from 450 strokes to 750 strokes.

26. An adhesive tape comprising a substrate comprised exclusively of a stitched fleece wherein the stitched fleece is formed at least 80% from long fibers having a fiber length in the range from 80 mm to 120 mm, and further comprising in that the stitched fleece contains short fibers which have a length in the range from 40 mm to 60 mm.

* * * * *